April 30, 1968 J. W. McCOMAS 3,380,691
MINIMUM AIRFRAME FOR MAXIMUM EXTERNAL LOAD
Filed July 23, 1965 3 Sheets-Sheet 1
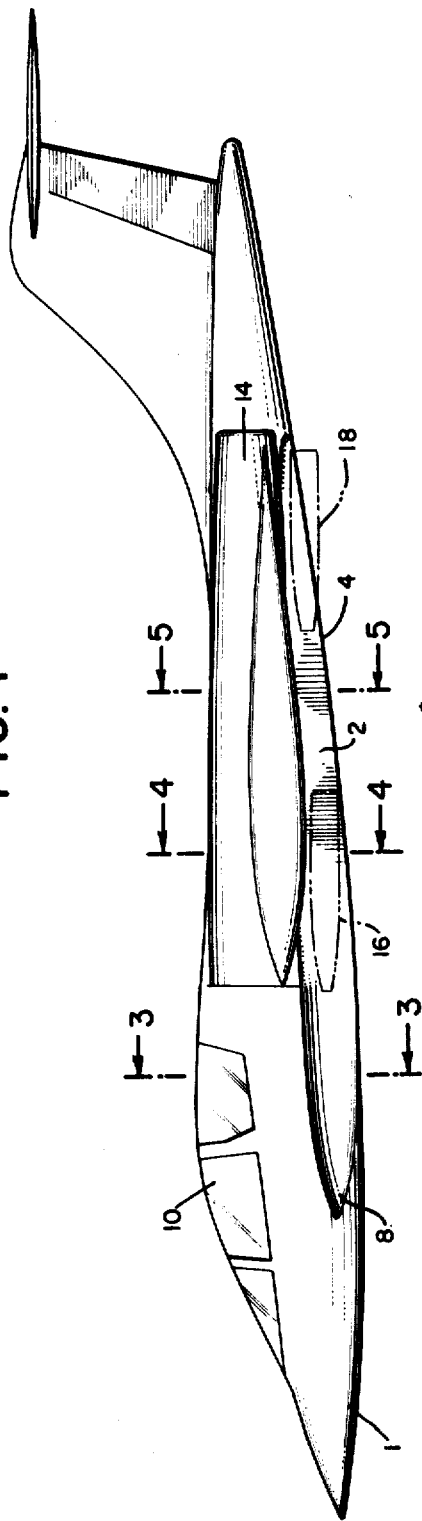
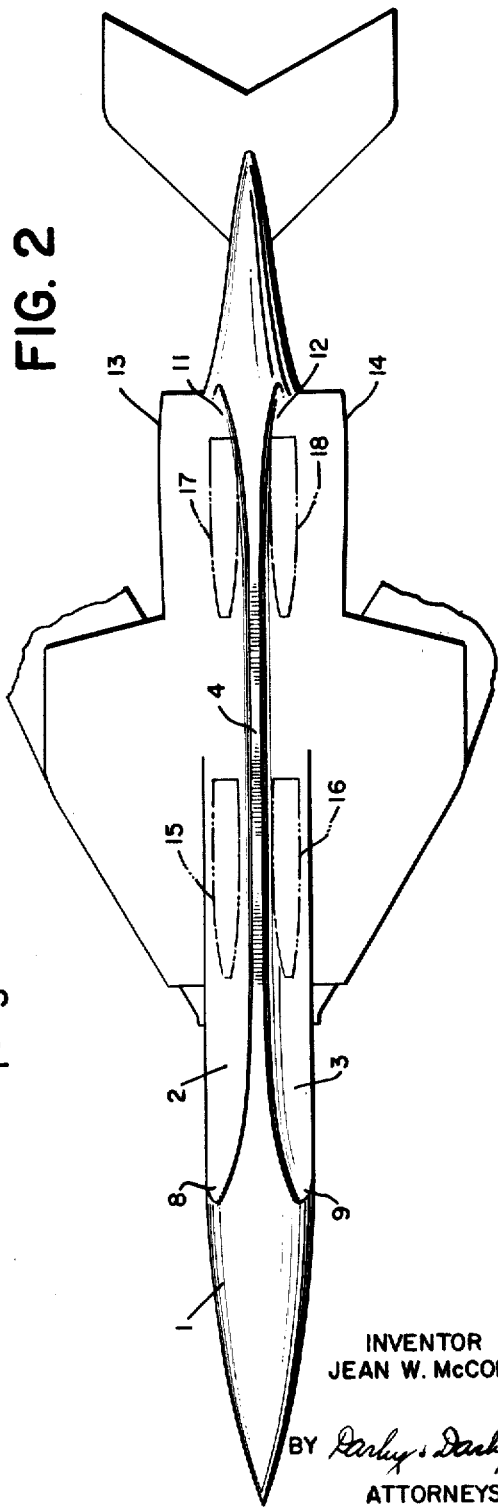
INVENTOR
JEAN W. McCOMAS
BY *Darby & Darby*
ATTORNEYS April 30, 1968  J. W. McCOMAS  3,380,691
MINIMUM AIRFRAME FOR MAXIMUM EXTERNAL LOAD
Filed July 23, 1965  3 Sheets-Sheet 2
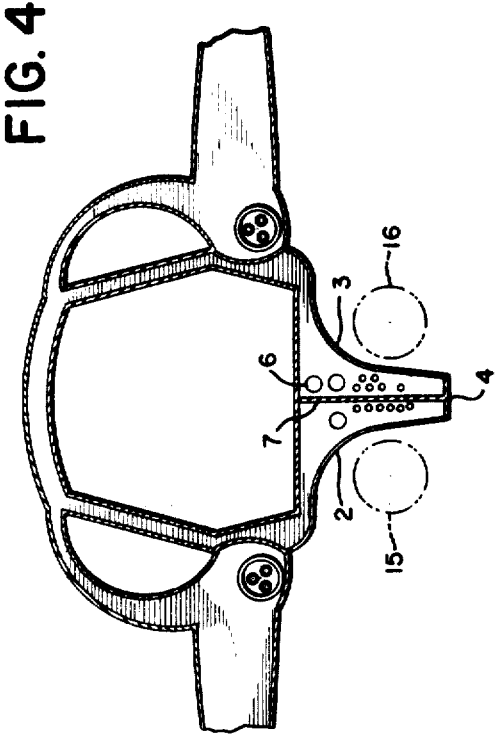
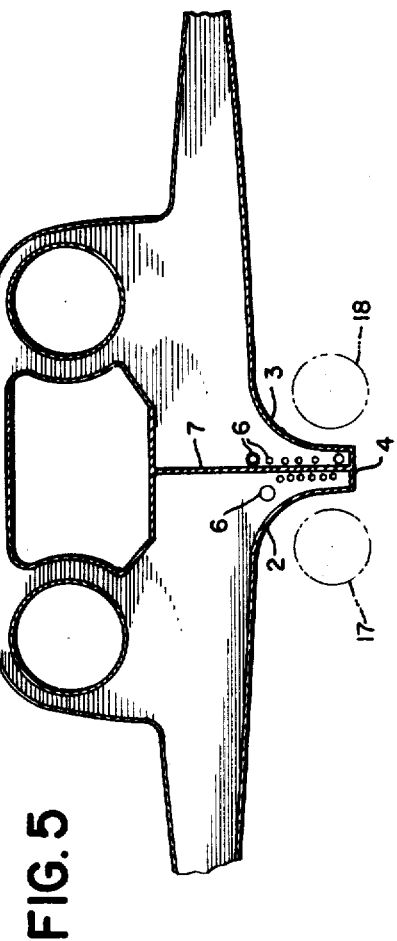
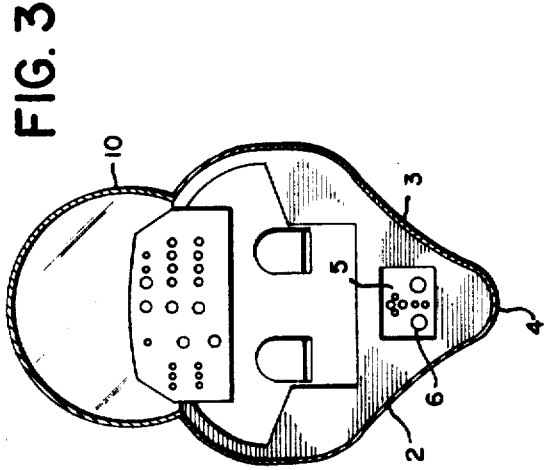
INVENTOR
JEAN W. McCOMAS
BY
*Darby + Darby*
ATTORNEYS April 30, 1968   J. W. McCOMAS   3,380,691

MINIMUM AIRFRAME FOR MAXIMUM EXTERNAL LOAD

Filed July 23, 1965   3 Sheets-Sheet 3

INVENTOR
JEAN W. McCOMAS

BY *Darby & Darby*
ATTORNEYS

3,380,691
MINIMUM AIRFRAME FOR MAXIMUM EXTERNAL LOAD
Jean W. McComas, Islip, N.Y., assignor, by mesne assignments, to Fairchild Hiller Corporation, Hagerstown, Md., a corporation of Maryland
Filed July 23, 1965, Ser. No. 474,229
3 Claims. (Cl. 244—118)

ABSTRACT OF THE DISCLOSURE

An aircraft fuselage having a pair of load carrying recesses disposed on the bottom of the fuselage symmetrically about the centerline of the fuselage and located in the aerodynamic shadow of the nose. Each of the recesses is open on the bottom and on the outboard side.

---

This application relates to a structure for an aircraft fuselage having an improved load-carrying configuration.

In the past aircraft have been provided with two principal means for carrying weapons systems and auxiliary fuel tanks. The principal means usually provides a compartment within the fuselage for placement of the load. If used in connection with a weapons system this necessitates the use of doors and their attendant mechanisms for opening the compartment and releasing the weapon. The second means employs an external fitting on the fuselage or wing to which is attached the desired load. The latter method of attachment exposes the weapon to the air stream and therefore results in additional drag on the aircraft, resulting in loss of speed and range, until release of the load. Further due to the requirement for a minimum clearance between the fuselage and the ground, placement of an external load under the fuselage is limited.

The aircraft configuration of my invention provides the benefits of retaining the weapons system substantially clear of the air stream while eliminating the necessity for costly doors on a load-carrying compartment. My aircraft fuselage is constructed with a pair of longitudinal depressions on the fuselage, below the horizontal centerline, of sufficiently deep penetration into the fuselage so that external loads carried therein are substantially clear of the air stream. The depressions are separated by a structural bearing member or keel which extends the length of the depressions along the centerline. The depressions are located to the rear of the nose portion of the aircraft, in the shadow of the nose, therefore placing a large portion of the load outside of the main air stream. In order to release a weapon the attaching shackle is operated and the weapon falls clear of the fuselage. The profile of the fuselage remains free of projecting appliances after completion of the release thereby providing increased efficiency of operation.

My invention will be described in greater detail below and in the drawings in which:

FIG. 1 is a profile view of an aircraft fuselage employing my invention;

FIG. 2 is a bottom view of the fuselage shown in FIGURE 1;

FIG. 3 is a section of the fuselage taken along line 3—3 of FIGURE 1;

FIG. 4 is a section of the fuselage taken along line 4—4 of FIGURE 1;

FIG. 5 is a section of the fuselage taken along line 5—5 of FIGURE 1;

Figure 6:
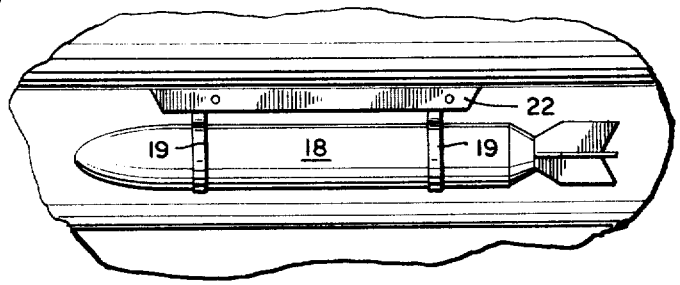
FIG. 6 is a partial plan view of a section of the recess showing a bomb release mechanism.

Referring to FIGS. 1 and 2 an aircraft fuselage 1 having a generally conventional configuration is provided with a pair of depressions 2 and 3 located below the aircraft centerline. The depressions extend substantially longitudinally along the fuselage and are mirror images of each other. A keel 4, as shown in FIGS. 3, 4 and 5, depending from the main fuselage separates depressions 2 and 3 and is provided with a hollow passage 5 to allow placement of fuel lines, hydraulic lines and electrical conduits 6 therein. The placement of the fuel lines, hydraulic lines, and electrical conduits in passage 5 minimizes the fire hazard to the aircraft of these lines. In addition, the placement of these lines in this location simplifies access and reduces the weight required for access panels. A main structural member 7 is located in the center of keel 4 and provides strength for the center section of the aircraft fuselage. The exterior wall of keel 4 conforms to the normal external configuration of the fuselage at the various points along its length.

The depressions 2 and 3 have leading edges 8 and 9 which blend into the exterior for the fuselage in the vicinity of the pilot's compartment 10. The rear edges 11 and 12 of the depressions are located at approximately the termination of the engine exhausts 13 and 14.

Referring to FIGS. 3, 4 and 5 the depressions 2 and 3 have varying depths along their lengths. As shown in FIG. 4, the depressions reach their maximum depth approximately half way down their length.

Figure 7:
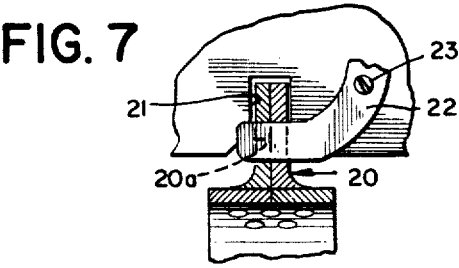
FIG. 7 is a partial sectional view of the mechanism of FIG. 6 showing the bomb release mechanism in detail.

A weapons load 15, 16, 17 and 18 of generalized configuration is shown in FIGS. 1 and 2 in place in depressions 2 and 3. The weapons are secured to the fuselage by a shackle which is capable of release at a selected point in the flight profile. One such system for releasing a load is described in Patent No. 3,077,818 issued Feb. 19, 1963 and which is shown in FIGS. 6 and 7. A bomb 18 is held in place by means of retaining bands 19 located at the front and rear of the bomb. The retaining bands are secured to the aircraft structure by means of extending lugs 20 which are retained in groove 21 located in the depression or in a bomb retaining holder 22 which may extend outwardly from the surface of the depression. The bomb is held in position during flight by a hook 22 which is pivotally mounted around screw 23 and which engages slot 20a in lug 20. Hook 22 is controlled by the pilot to selectively release the bomb. Although one specific form of release mechanism is disclosed herein it is apparent that any of the conventionally used release mechanisms may be employed. Release may occur by manual operation by the pilot or by automatic means. Although the weapons systems 15, 16, 17 and 18 are located within the depressions, they may have a portion of their configuration outside of the depressions. A substantial portion of their bodies, however, are located within the depressions and therefore outside of the air stream.

The provision of depressions, as described herein, below the fuselage permits the placement of a variety of weapons systems at a location close to the longitudinal centerline of the aircraft. The weapons have a greater clearance from the ground than would be possible if they were externally connected to a conventional fuselage. This facilitates the operation and design of the aircraft by permitting a smaller clearance between the fuselage and the ground when launching. The location of the load inboard of the wings reduces the structural requirements of the wing since the load is closer to the centerline and also reduces the amount of unbalance that will occur if the weapons are released asymmetrically.

It has been proposed to use flexible external fuel tanks to supplement the normal fuel supply for extended range missions. Tanks of this type can be designed to conform to the shape of the depressions thereby removing a major portion of their configuration from the air stream. Further, if the tanks are initially located with a portion in the air stream, as the fuel is expended the tank can contract into the depressions thereby returning the outside configuration of the aircraft to an optimum condition at an early stage of the flight profile. This will result in increased speed and range.

Figure 8:
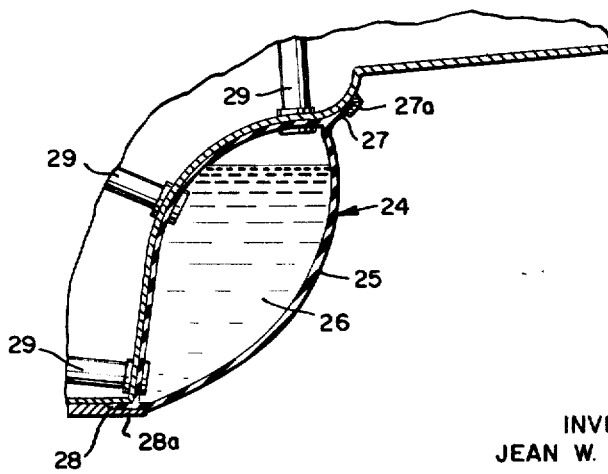
FIG. 8 is a cross-sectional view of a recess of this invention showing a collapsible fuel tank.

One form of a collapsible fuel tank is described in U.S. Patent No. 2,777,656 issued Jan. 15, 1957 and is shown in FIG. 8. As shown therein the collapsible fuel tank 24 consists of elastic membrane 25 forming the outer surface of the depression when the tank is filled with fuel 26. The membrane is secured to ends 27 and 28 to the aircraft structure by means of overlapping flanges 27a and 28a. As fuel 26 is withdrawn through conduits 29 from the tank, the tank will collapse inwardly towards the depression, reducing the drag on the aircraft caused by the tank. This will permit reduction in drag prior to the time all of the fuel is expended from the tank without requiring that the tank be jettisoned.

It is to be understood that although I have shown a particular aircraft fuselage configuration, my invention is applicable to most types of aircraft fuselages.

What is claimed is:

1. In an aircraft having a fuselage the improvement comprising a first and second depression located below the horizontal centerline of the fuselage, said depressions being located symmetrically to each other on opposite sides of the fuselage, said depressions having their longest dimensions substantially parallel to the longitudinal centerline of the fuselage, each of said depressions having a top and a side wall extending substantially the length of said depression and being open at the bottom and remaining side, said top walls being substantially in a horizontal plane and each of said side walls depending substantially perpendicularly from its respective top wall to form a keel along the centerline of the fuselage, each of said depressions further being located during at least a portion of the flight in the aerodynamic shadow of the nose of the fuselage and each of said depressions being adapted to at least partially receive an external load.

2. The fuselage of claim 1, further including means located in said depressions for releasably securing an external load.

3. The fuselage of claim 1, further including at least one collapsible fuel tank located in one of said depressions and adapted to collapse into said depression as fuel is removed.

References Cited

UNITED STATES PATENTS

| | | | |
|---|---|---|---|
| 2,029,048 | 1/1936 | Atwood | 244—133 X |
| 2,463,351 | 3/1949 | Bowers | 244—105 X |
| 2,591,913 | 4/1952 | Bowers | 244—118 X |
| 2,793,827 | 5/1957 | Ries | 244—105 |
| 3,101,921 | 8/1963 | Price | 244—135 |

MILTON BUCHLER, *Primary Examiner.*

T. W. BUCKMAN, *Assistant Examiner.*